United States Patent [19]

Fischer et al.

[11] Patent Number: 4,555,564

[45] Date of Patent: Nov. 26, 1985

[54] ALKYD RESINS CONTAINING HYDROXYL GROUPS

[75] Inventors: Herbert Fischer; Manfred Gorzinski, both of Duesseldorf; Wolfgang Gress, Wuppertal-Elberfeld; Alfred Meffert, Monheim; Bernd Wegemund, Haan, all of Fed. Rep. of Germany

[73] Assignee: Henkel KGaA, Duesseldorf, Fed. Rep. of Germany

[21] Appl. No.: 716,596

[22] Filed: Mar. 27, 1985

Related U.S. Application Data

[63] Continuation of Ser. No. 612,754, May 21, 1984.

[30] Foreign Application Priority Data

May 21, 1983 [DE] Fed. Rep. of Germany ....... 3318595

[51] Int. Cl.$^4$ ............................................. C08G 63/54
[52] U.S. Cl. ................................. 528/295.3; 524/604; 528/295.5
[58] Field of Search ..................... 524/602; 528/295.3, 528/295.5

[56] References Cited

U.S. PATENT DOCUMENTS

| 4,248,745 | 2/1981 | Laganis | 528/295.3 |
| 4,271,051 | 6/1981 | Eschwey | 260/22 M |
| 4,446,301 | 5/1984 | Belote et al. | 528/295.3 |

FOREIGN PATENT DOCUMENTS

| 2842919 | 4/1980 | Fed. Rep. of Germany . |
| 2922370 | 12/1980 | Fed. Rep. of Germany . |
| 1038696 | 8/1966 | United Kingdom . |

Primary Examiner—Lucille M. Phynes
Attorney, Agent, or Firm—Ernest G. Szoke; Henry E. Millson, Jr.; Mark A. Greenfield

[57] ABSTRACT

A process for preparing alkyd resin emulsions where a precondensate is further condensed to an acidic precondensate which is esterified to yield a resin which is then emulsified, and the products of this process.

31 Claims, No Drawings

ALKYD RESINS CONTAINING HYDROXYL GROUPS

This application is a continuation of application Ser. No. 612,754, filed 5/21/84.

BACKGROUND OF THE INVENTION

1. Field of the Invention

This invention relates generally to aqueous lacquers. More particularly, the invention relates to new alkyd resins which may be processed to form aqueous lacquers that are particularly harmless to the environment.

2. Statement of the Prior Art

It is known that alkyd resins having a high hydroxyl number (above 100) and a considerable residual acid number may be used in the production of oven-drying aqueous lacquer systems that are particularly harmless to the environment. To produce alkyd resins such as these, it is standard practice to start with resins having a high acid number, for example in the range from 30 to 180, and to produce the required resins by condensation with substances containing or yielding OH-groups.

British Pat. No. 1,038,696 discloses condensing acidic resins containing polyethylene glycol units by reaction with polyfunctional alcohols, to an acid number below 10. After neutralization with amines for example, alkyd resins produced in this way are self-emulsifying and may be formulated into aqueous lacquers which, unfortunately, do not have the required resistance to water after heating. Another disadvantage of these resins is that incompatibilities often arise at the pigmenting stage causing reduced gloss.

German Pat. No. 2,842,919 discloses hydroxyl-group-containing alkyd resins having an acid number of from 5 to 35 and, more particularly, from 15 to 30, in which it is proposed to esterify an acid-group-containing resin having a starting acid number of from 30 to 180 with glycidol. Although binders having favorable properties may be obtained in this way, the use of glycidol involves problems because this starting material is difficult to obtain and difficult to handle.

Accordingly, U.S. Pat. No. 4,271,051 (and corresponding German Patent Application No. 29 22 370) proposes condensing an acidic resin having an acid number of from 30 to 180 with glycerol to an acid number of from 5 to 35 and more particularly from 15 to 30. After neutralization, the resins may be processed to form clear, solvent-free aqueous preparations. However, the aqueous preparations thus obtained are sensitive to calcium ions which are entrained, for example, during pigmenting with calcites. Another disadvantage of the systems in question is that their resistance to water is still inadequate for numerous applications. Accordingly, there is a need for a new aqueous lacquer system based on a resin having an acid number below 40 and a high OH-number which may easily be produced from readily obtainable starting materials, which may be pigmented with calcite, and which shows the required resistance to water.

DESCRIPTION OF THE INVENTION

The present invention provides improved alkyd resins for aqueous lacquers which have acid numbers of from 10 to 40 and a process for their production. After neutralization with aminoalcohols, the resins may be formulated into clear, aqueous preparations in the absence of organic solvents, optionally using emulsifiers which do not reduce the resistance to water of the solid lacquer film. The invention also provides a process for producing these aqueous preparations as well as highly solubilizing emulsifiers particularly suitable for that purpose.

The production scheme for the resins of this invention is most generally illustrated by the following.

| step a: | carboxylic acid + polyalcohol → | polyester (precondensate) |
|---|---|---|
| step b: | polyester + polycarboxylic anhydride → | polyester-polycarboxylate (acidic pre-condensate) |
| step c: | polyester- + polycarboxylate polyalcohol → | alkyd resin |
| step d: | alkyd resin + water + amino-alcohol + emulsifier → | finished product |

Within the context of the above scheme, the more specific process for preparing the resins of this invention is as follows.

(a) precondensate: fatty acids and/or polyfunctional carboxylic acids or reactive derivatives thereof are reacted with polyfunctional alcohols to form a polyester containing terminal hydroxyl groups and having an acid number below 2.

(b) acidic precondensate: the polyester is converted into an acidic precondensate (with an acid number: of from 50 to 130) by reaction with polyfunctional carboxylic acids and/or reactive derivatives thereof.

(c) alkyd resin: the acidic precondensate is condensed by reaction with alcohols having a functionality of more than 2 to form a hydrophilic alkyd resin having an acid number below 40.

(d) finished product: the alkyd resin thus obtained is dispersed in water in the presence of amino-alcohols and, if desired, OH-functional emulsifiers.

It may be noted that the process according to this Application No. 29 22 370, discussed previously. Thus, this invention prepares a precondensate having a relatively high acid number and condenses it using hydrophilic polyols, including glycerol, to a final acid number in the desired range. An important aspect of the inventive process is based on the observation that the desired results can only be obtained by selecting special precondensate resins, namely those having an acid number in the range from 50 to 130 and more particularly in the range from 60 to 90, with a molecular structure which can only be obtained by a two-stage production process.

Although the theoretical considerations on which the invention is based have not been investigated, it may reasonably be assumed that a narrower molecular weight distribution and, in particular, a reduction in the content of free fatty acids are achieved through the two-stage condensation process adopted for the production of the precondensates.

DESCRIPTION OF PREFERRED EMBODIMENTS

Reaction Step (a)

According to the invention, fatty acids and/or reactive derivatives thereof are esterified in a known manner with polyfunctional alcohols and, if desired, polyfunctional carboxylic acids or reactive derivatives thereof for producing the precondensates.

The choice of the starting materials in this first step is not critical. Thus, the fatty acids used may be fractions of short-chain or long-chain fatty acids with a high or low proportion of unsaturated compounds, of the type obtainable by the esterification of naturally occurring triglycerides. It is also possible to use $C_{6-24}$ synthetic branched fatty acids or other long-chain carboxylic acids.

Of particular interest are at least one and preferably mixtures of naturally occurring fatty acids having predominantly from 6 to 24 carbon atoms. Examples of specific useful mixtures include:

(a) $C_{8-18}$ fractionated coconut oil fatty acids in which at least 40% by weight is lauric, at least 10% by weight is myristic and at least 10% by weight is palmitic; (b) $C_{14-18}$ selectively hardened tallow fatty acids in which at least 35% by weight is oleic, at least 20% by weight is palmitic, and at least 20% by weight is stearic; or (c) predominantly $C_{8-12}$ fractionated fatty acids in which at least 55% by weight is caprylic and at least 30% by weight is capric.

If desired, polyfunctional carboxylic acids and/or reactive derivatives thereof may be used. In that case, it is possible to use both aliphatic and aromatic di- and/or tri- carboxylic acids. Examples are glutaric acid, adipic acid, sebacic acid and their homologs and also phthalic acid and its isomers or trimellitic acid. The reactive derivatives that may be used are primarily anhydrides, the cyclic anhydrides, for example maleic acid anhydride, being preferred.

The polyfunctional alcohols are those polyols useful in formulating alkyd resins. Where the alcohols are dihydroxy they should have about from 2 to 30 carbon atoms; where the alcohols are trihydroxy they should have about from 3 to 30, preferably 3 to 12, carbon atoms; where the alcohol has 4 to 10 hydroxy groups, it may have 4 up to 75 carbon atoms. While preferred, these ranges are not absolutely critical. Mixtures of these alcohols may be used. Thus, it is possible to use glycols, such as ethylene glycol, propylene glycol, neopentyl glycol and their dimers or trimers, homologs containing up to 8 carbon atoms and also their isomers. Neopentyl glycol and/or diethylene glycol or dipropylene glycol are particularly suitable.

In addition, it is possible to use alcohols having a functionality of 3 or more, such as glycerol, trimethylol ethane, trimethylol propane, pentaerythritol, dipentaerythritol, sorbitol or other sugar alcohols. Mixtures of the above polyols or polycarboxylic acids may also be used.

The condensation step is carried out by conventional methods. Thus, the water by-product may be zeotropically removed from the reaction mass, for example in the presence of an aromatic solvent which is subsequently distilled-off. The water of reaction may also be removed in a stream of nitrogen. The esterification reaction may also be catalyzed. Suitable catalysts are strong acids, such as sulfonic acid or even sulfuric acid. The esterification reaction is carried out at temperatures in the range about from 120° to 220° C., preferably about from 140° to 200° C. Condensation is continued until virtually all the available carboxyl groups have disappeared, i.e. until the acid number amounts to less than 2, and preferably approaches 0, to assure that polyesters containing terminal hydroxyl groups are formed.

Reaction Step (b)

The polyesters containing terminal hydroxyl groups produced in the first step of the process according to this invention are converted into acidic precondensates in the second step. To that end, they are reacted with anhydrides of dicarboxylic acids, tricarboxylic acids, or higher polycarboxylic acids, at temperatures in the range about from 140° to 200° C., some of the terminal hydroxyl groups in the polyester being converted into terminal carboxyl groups. In this step, however, condensation may be continued to a further stage with an increase in molecular weight, depending on the reaction conditions applied, i.e. the temperature and reaction time. The quantity of di- and/or tricarboxylic acid anhydrides used in the second step should be measured in such a way that the acid number of the acidic precondensate obtained is in the range about from 50 to 130, preferably about from 60 to 90. The anhydrides of di- and/or tricarboxylic acids or of carboxylic acids having a functionality of more than 4 which are used in step (b) may correspond to the products already used in the first reaction step. In this case, too, it is preferred to use cyclic anhydrides, such as succinic acid anhydride, glutaric acid anhydride, maleic acid anhydride, phthalic acid anhydride or trimellitic acid anhydride.

Reaction Step (c)

According to this invention, the acidic precondensate containing terminal carboxylic acid groups from the second step is further condensed in a third step using alcohols having: a functionality of about from 3 to 10, preferably 3 to 6; up to 10 ether radicals; and a number-average molecular weight of less than 1,000; to form an alkyd resin containing hydroxyl groups. The reaction conditions correspond to the conditions described for the first step with regard to temperature and reaction procedure.

It is already known that acidic precondensates may be hydrophilized with glycerol, trimethylol ethane, trimethylol propane or pentaerythritol.

According to this invention, however, many compounds in addition to those mentioned may be used as the alcohols in reaction step (c). Thus, triols are used in a first embodiment of the invention.

In another embodiment of the invention, tetrafunctional alcohols are used. Suitable tetrafunctional alcohols are, for example, pentaerythritol and also the dimerization products of glycerol, trimethylol propane or trimethylol ethane. It is also possible to use reaction products of all the trifunctional and tetrafunctional alcohols mentioned with up to 5 mols of ethylene oxide and/or propylene oxide.

Another embodiment of the invention relates to the use of alcohols containing more than 4 and up to 10 hydroxyl groups. The only requirement here is a number-average molecular weight below 1000. Suitable alcohols are sugar alcohols such as sorbitol, the condensation products of glycerol with 2 to 4 ether oxygens (known as polyglycerols), dipentaerythritol, and the reaction products of the above-mentioned alcohols with up to 10 mols of ethylene oxide and/or propylene oxide.

The esterification of the acidic precondensate with the polyalcohols is continued until an acid number of about from 10 to 40 is achieved. However, acid numbers of about from 15 to 35 are preferred, acid numbers in the range about from 20 to 25 being particularly preferred.

Reaction Step (d)

The alkyd resin produced in reaction step (c) may then be converted to a finished product by neutralizing it and mixing it with water, optionally in the presence of an emulsifier, to afford a clear, aqueous composition. The amount of water in the emulsion is not critical and may range from 5 to 25% by weight, 15% by weight of water aqueous emulsions being preferred.

Amines are suitable for neutralization. Thus, it is possible to use the aminoalcohols mentioned in British Pat. No. 1,003,326 such as methylaminopropanol, especially 2-methyl-2-aminopropanol, methylaminopropane diol, especially 2-methyl-2-aminopropane diol or tris-hydroxymethyl aminomethane. Their reaction products with ethylene oxide are also suitable. It is also possible to use di- and tri-ethanolamine and also methyl diethanolamine and other involatile amines of the type normally used in aqueous lacquers.

Emulsifiers need not be added in every instance to the resins of this invention for formulating them with water, although it is advisable to do so in cases where the resins contain relatively long-chain fatty acids, i.e. those having average chain length of greater than $C_{16}$. In order not to affect the performance properties of the lacquer films adversely, it is preferred to use emulsifiers which are incorporated in the resin under condensation conditions. Thus, it is possible to use emulsifiers containing numerous hydroxyl groups, or emulsifiers which degrade under the reaction conditions into non-hydrophilic fragments. Such emulsifiers should be hydroxyl-functional and be at least one salt of an aminoalcohol (such as those mentioned previously) with a hydroxyalkoxystearic acid containing at least one hydroxyl group in the alkoxy radical. Emulsifiers of this type are mentioned in U.S. Pat. No. 4,271,051, discussed previously.

Other emulsifiers particularly suitable for use with the resins of this invention are the salts of aminoalcohols with 9,10-hydroxyalkoxystearic acids which contain at least one other hydroxyl group in the alkoxy radical. Although these compounds do not have the classic structure of an emulsifier, they do have an outstanding solubilizing effect and are therefore particularly suitable for aqueous lacquers. In addition, the compounds lose their hydrophilicity during heating through incorporation in the resin both via hydroxyl groups and also via the acid group.

Production of these particular hydroxyalkoxycarboxylic acids is described in conjointly filed U.S. application Ser. No. 06/612,161 entitled "Hydroxyalkoxycarboxylic Acids and Their Salts", which is incorporated herein by reference. Specifically, 9,10-epoxystearic acid esters are initially reacted with an excess of polyfunctional alcohols with opening of the ring and transesterification. This is followed by hydrolysis to form the free acid and neutralization with the required aminoalcohol. Hydroxyalkoxystearic acids of which the alkoxy radical is derived from glycols, such as ethylene glycol, propylene glycol or their homologs, are suitable for the purposes of the invention. It is preferred to use hydroxyalkoxystearic acids of which the alkoxy radical is derived from the alcohols having a functionality of more than 2 which are used in step c of the production of the alkyd resins according to this invention and which were described previously. The hydroxyalkoxy stearic acids are preferably neutralized with the same aminoalcohols used for neutralizing the resin.

Particularly useful hydroxyl-functional emulsifiers may be described as the salts of aminoalcohols with 10,9- and/or 9,10-hydroxyalkoxystearic acids of which the alkoxy radical is derived from polyfunctional alcohols containing from 3 to 6 hydroxyl groups, particularly glycerol, trimethylol propane, pentaerythritol, sorbitol or the autocondensation products of these alcohols or the reaction products of these alcohols with up to 10 mols of ethylene oxide per mol of alcohol, or any mixtures of the foregoing. In a preferred embodiment of the invention, the hydroxyalkoxystearic acids are added to the resin at the end of step c and then neutralized together with the acid.

The aqueous preparations of the new alkyd resins may be processed in conjunction with water-soluble melamine or urea-formaldehyde resins as hardeners and, if desired, other standard additives to form aqueous lacquers. The aqueous lacquers thus obtained may be pigmented by the methods normally used for aqueous lacquers. It is emphasized that the alkyd resin compositions of this invention may even be pigmented with calcite, unlike the prior art. Both clear and pigmented lacquers based on the alkyd compositions of this invention may be heat treated to form coatings having excellent properties. In this connection, the high water resistance of this invention's lacquer films compared with the prior art is particularly emphasized.

EXAMPLES

A. Production of Alkyd Resins

The condensation reaction was conducted conventionally under nitrogen in a heatable esterification apparatus. The water of reaction was removed in the stream of nitrogen.

Resin Example 1

The following components were condensed:
Step a (precondensate) temperature 150°–220° C.
125.15 kg of fractionated coconut fatty acid with the following chain-length distribution (all percentages by weight):
6% caprylic acid
6% capric acid
48% lauric acid
18% myristic acid
16% palmitic acid
2% stearic acid
8% oleic acid
49.46 kg of trimethylol propane
110.25 kg of the reaction product of trimethylol propane with 6 mols of propylene oxide
165.08 kg of neopentyl glycol
0.60 kg of 4-toluene sulfonic acid
Condensation was continued until the acid number had fallen below 1. 12.51 kg of condensate (water of reaction) were obtained.
Step b (acidic precondensate) temperature 150°–220° C.
147.20 kg of phthalic acid anhydride
114.42 kg of trimellitic acid anhydride
Condensation was continued until an acid number of 78 was reached.
22.05 kg of condensate were obtained.
Step c (alkyd resin) temperature 150°–220° C.
150.77 kg of the reaction product of dipentaerythritol with 5 mols of ethylene oxide
Condensation was continued until an acid number of 28 was reached.

14.30 kg of condensate were removed.
Step d (production of a 15% by weight of water aqueous preparation) temperature 80°-90° C.
36.35 kg of 2-amino-2-methylpropanol
150.18 kg of water
1000 kg of a 15% by weight of water aqueous resin preparation were obtained.

Resin Example 2

The procedure was as in Resin Example 1, except that the fractionated coconut fatty acid was replaced by the same molar quantity of a selectively hardened tallow fatty acid with the following chain-length distribution (all percentages by weight):
3% myristic acid
26% palmitic acid
24% stearic acid
40% oleic acid After step b, the acid number was 76.5.

In step c, the dipentaerythritol-5-ethylene oxide was replaced by glycerol in such a way that the number of hydroxyl groups remained constant. Condensation was continued until an acid number of 25.0 was reached.
Step d To produce an aqueous preparation, 19.3 g of 2-amino-2-methylpropanol were added to 500 g of the prepared alkyd resin. Water (70 g) was added together with the salt of 2-amino-2-methyl propanol and, as an emulsifier, a 9,10-hydroxyalkoxystearic acid, in which the alkoxy radical was derived from trimethylol propane.

Resin Example 3

The procedure was as in Resin Example 2, except that the selectively hardened tallow fatty acid was replaced by an equimolar quantity of a fractionated fatty acid having the following chain-length distribution (all percentages by weight):

60% caprylic acid
35% capric acid
3% lauric acid
2% higher fatty acids

In step c, the quantity of glycerol was increased by 5 mol percent. The acid number after step b was 86.9 and, after step c, 27.9.

B. Preparation of a White Lacquer Using the Inventive Composition

A ground paste was prepared from (parts by weight):
50 parts of alkyd resin (85% resin in water), according to this invention
32 parts of deionized water
30 parts of pigmenting aid (9 parts of a 30% acid-group-containing, low molecular weight acrylate dispersion (Primal-I-94, a trademark of Rohm & Haas Co.) and 1 part of 2-methyl-2-aminopropanol, 75% by weight in water)
183 parts of titanium dioxide (Chronos Titan CL 310). This paste was made up into a lacquer with
309 parts of alkyd resin (85% resin in water), according to this invention
131 parts of a melamine resin (Cymel 301, a trademark of American Cyanamid Co.)
265 parts of deionized water
1000 parts of white lacquer with an alkyd resin to melamine resin ratio of 7:3 and a pigment volume concentration of approximately 11% were obtained.

C. Testing of the Coatings

To test the films, the lacquers were sprayed onto steel plates and heat treated for 15 and 30 minutes, respectively, at 160° C. The dry film thicknesses amounted to 25-40 μm. The results obtained are given in the following table. The "Sweatbox" Test determines the resistance of a lacquer film to water.

TABLE 1
(Part A)

|  | Example 1 | | Example 2 | | Example 3 | | Comparison Example (Example 1 of) U.S. Pat. No. 4,271,051 | |
| --- | --- | --- | --- | --- | --- | --- | --- | --- |
| Heat treating time + temperature | 15' 150° C. | 30' 160° C. | 15' 160° C. | 30' 160° C. | 15' 160° C. | 30' 160° C. | 15' 160° C. | 30' 160° C. |
| Film Thickness μm | 34 | 36 | 38 | 33 | 33 | 37 | | |
| % Gloss - 20° | 55 | 51 | 63 | 67 | 56 | 70 | | |
| Pendulum hardness (sec.) | 124 | 144 | 99 | 157 | 175 | 196 | | |
| Cross-hatching | 0 | 0 | 0 | 0 | 0 | 6-1 | | |
| Erichsen indentation (mm) | 6.8 | 4.9 | 7.3 | 7.1 | 5.4 | 5.6 | | |
| Calcite compatability | + | | + | | + | | − | |
| Remarks | | | too soft | | | | over-baked | |

TABLE 1
(Part B)

|  |  | Example 1 | Example 2 | Example 3 | Comparison Example (Example 1 of) U.S. Pat. No. 4,271,051 |
| --- | --- | --- | --- | --- | --- |
| Sweatbox 40° C. assessed in accordance with DIN 53 209 | 24 h | 0  0 | 0 | 0  0 | 0 |
| | 48 h | 0  0 | 0 | 0  0 | ⅜ m 3 91 |
| | 120 h | ⅜ m 5 91 | 0 | 0  0 | 72 h ⅜ m 5 92 |
| | 144 h | ⅜ m 5 92 | 0 | 0  0 | |

TABLE 1-continued (Part B)

|  | Example 1 | Example 2 | Example 3 | Comparison Example (Example 1 of) U.S. Pat. No. 4,271,051 |
|---|---|---|---|---|
| 168 h | ⅔ m 5 / 92 | 0 | 0 / m 1 / 91 | 0 |
| 192 h | ⅔ m 5 | 0 | 264 h / ½ m 3 / 91 | 240 h / m 1 / 91 | m 1 / 91 | 0 |
| Viscosity of the lacquers (m · Pa · s) | 6200 | 6850 | 5720 | 6800 |

We claim:

1. A process for synthesizing alkyd resin compositions comprising:
    (A) condensing a carboxylic acid with an alcohol to form a polyester precondensate having terminal hydroxyl groups, wherein
        (1) said carboxylic acid is a fatty acid, a polycarboxylic acid, a reactive derivative thereof, or any mixture thereof,
        (2) said alcohol is at least one polyfunctional alcohol,
        and said condensation reaction is conducted at a temperature of about from 120° to 220° C. and is continued until the acid number of the precondensate is less than 2;
    (B) converting said precondensate into an acidic precondensate by further condensation with a polycarboxylic acid anhydride wherein
        (1) said polycarboxylic acid anhydride is a dicarboxylic acid anhydride, a tricarboxylic acid anhydride, a higher polycarboxylic acid anhydride, or any mixture thereof,
        and said further condensation is conducted at a temperature of about from 140° to 200° C. and continued until an acid number of about 50 to 130 is obtained; and
    (C) forming an alkyd resin by further esterification of said acidic precondensate with a further alcohol wherein
        (1) said further alcohol is at least one polyol having a functionality of from 3 to 10 or any mixture thereof,
        and said further esterification reaction is conducted at a temperature of about from 120° to 220° C. and is continued until an acid number of about 10 to 40 is obtained.

2. The process of claim 1 with an additional step comprising:
    (D) forming an alkyd resin emulsion by mixing said alkyd resin with an aminoalcohol present in an amount sufficient to neutralize said alkyd resin, and water.

3. The process of claim 2 wherein a hydroxylfunctional emulsifier is present is step (D)

4. The process of claim 1 wherein in step (A),
    (1) said carboxylic acid is at least one naturally occurring, or synthetic branched-chain, fatty acid having predominantly from 6 to 24 carbon atoms; at least one aliphatic or aromatic di- or tri-carboxylic acid or its anhydride; or any mixture thereof; and
    (2) said alcohol is dihydroxy and has about 2 to 30 carbon atoms, is trihydroxy and has about 3 to 30 carbon atoms, has 4 to 10 hydroxy groups and up to 75 carbon atoms, or is any mixture thereof.

5. The process of claim 1 wherein in step (A), said carboxylic acid is a mixture of naturally occurring fatty acids selected from one of
    (a) $C_{8-18}$ fractionated coconut oil fatty acids in which at least 40% by weight is lauric acid, at least 10% by weight is myristic acid, and at least 10% by weight is palmitic acid,
    (b) $C_{14-18}$ selectively hardened tallow fatty acids in which at least 35% by weight is oleic acid, at least 20% by weight is palmitic acid, and at least 20% by weight is stearic acid, or
    (c) predominantly $C_{8-12}$ fractionated fatty acids in which at least 55% by weight is caprylic acid and at least 30%-by weight is capric acid,
or said carboxylic acid is at least one polycarboxylic acid or its derivative selected from
    (d) glutaric acid, adipic acid, sebacic acid, homologs of the foregoing, phthalic acid or its isomers, trimellitic acid, cyclic anhydrides of the foregoing, or maleic acid anhydride.

6. The process of claim 1 wherein in step (A) said alcohol is: ethylene glycol, propylene glycol, neopentyl glycol, or the dimers, trimers, homologs of the foregoing containing up to 8 carbon atoms, or isomers of the foregoing; alcohols having a functionality higher than 3 which are glycerol, trimethlyol ethane, trimethylol propane, pentaerythritol, dipentaenythritol, sorbitol; or any mixture of the above.

7. The process of claim 1 wherein in step (B) said carboxylic acid anhydride is a cyclic anhydride having a functionality of more than 4.

8. The process of claim 1 wherein in step (B) said carboxylic acid anhydride is at least one of succinic acid anhydride, glutaric acid anhydride, maleic acid anhydride, phthalic acid anhydride, or trimellitic acid anhydride.

9. The process of claim 1 wherein in step (C) said further alcohol has up to 10 ether radicals and a number-average molecular weight of less than 1,000.

10. The process of claim 1 wherein in step (C) said further alcohol has a functionality of from 3 to 6, and a number-average molecular weight of less than 1,000.

11. The process of claim 1 wherein in step (C) said further alcohol is at least one of: glycerol; trimethylol ethane; trimethylol propane; pentaerythritol; the dimerization products of glycerol, trimethylol ethane or trimethylol propane; reaction products of any of the foregoing with up to 5 mols of ethylene oxide or propylene oxide; a polyol having 4 to 10 hydroxyl group selected from sorbitol, a polyglycerol with 2 to 4 ether oxygens, depentaerythritol, the reaction products of any of the foregoing polyols having 4 to 10 hydroxyl groups with up to 10 mols of ethylene oxide or propylene oxide; or any mixture thereof.

12. The process of claim 2 wherein in step (D) said aminoalcohol is: methylaminopropanol; methylaminopropane diol; tris-hydroxymethylaminomethane; reaction products of the foregoing with ethylene oxide; diethanolamine, triethanolamine; methyldiethanolamine; or any mixture thereof.

13. The process of claim 3 wherein in step (D) said emulsifier is at least one salt of an aminoalcohol with a hydroxyalkoxystearic acid containing at least one hydroxyl group in the alkoxy radical.

14. The process of claim 3 wherein in step (D) said emulisfier is at least one salt of an aminoalcohol with a 10,9- or 9,10-hydroxyalkoxystearic acid of which the alkoxy radical is derived from polyfunctional alcohols containing from 3 to 6 hydroxyl groups, and any mixtures of the above.

15. The process of claim 14 wherein in said emulsifier the alkoxy radical is derived from: glycerol, trimethylol propane, pentaerythritol, or sorbitol; the autocondensation products of the foregoing alcohols; the reaction products of the foregoing alcohols with up to 10 mols of ethylene oxide per mol of alcohol, or any mixtures of the above.

16. The process of claim 1 wherein:
in step (A) said condensation reaction is conducted at a temperature of about from 140° to 200° C., and is continued until the acid number of the precondensate approaches 0;
in step (B) said further condensation is continued until an acid number of about from 60 to 90 is obtained; and
in step (C) said esterification is conducted at a temperature of about from 140° to 200° C., and is continued until an acid number of about 15 to 35 is obtained.

17. The process of claim 16 wherein:
in step (C) said esterification is continued until an acid number of about 20 to 25 is obtained.

18. The process of claim 2 wherein said emulsion is about 5% to 25% by weight of water.

19. The process of claim 3 wherein said emulsion is about 15% by weight of water.

20. A process for synthesizing alkyd resin compositions comprising:
(A) condensing a carboxylic acid with an alcohol to form a polyester precondensate having terminal hydroxyl groups wherein
  (1) said carboxylic acid is a mixture of naturally occurring fatty acids selected from one of
    (a) $C_{8-18}$ fractionated coconut oil fatty acids in which at least 40% by weight is lauric acid, at least 10% by weight is myristic acid, and at least 10% by weight is palmitic acid,
    (b) $C_{14-18}$ selectively hardened tallow fatty acids in which at least 35% by weight is oleic acid, at least 20% by weight is palmitic acid, and at least 20% by weight is stearic acid, or
    (c) predominantly $C_{8-12}$ fractionated fatty acids in which at least 55% by weight is caprylic acid and at least 30% by weight is capric acid,
  or said carboxylic acid is at least one polycarboxylic acid or its derivative selected from
    (d) glutaric acid, adipic acid, sebacic acid, homologs of the foregoing, phthalic acid or its isomers, trimellitic acid, cyclic anhydrides of the foregoing, or maleic acid anhydride,
  (2) said alcohol is: ethylene glycol, propylene glycol, neopentyl glycol, or the dimers, trimers, homologs of the foregoing containing up to 8 carbon atoms, or isomers of the foregoing; alcohols having a functionality higher than 3 which are glycerol, trimethylol ethane, trimethylol propane, pentaerythritol, dipentaenythritol, sorbitol, or any mixture of the above,
and said condensation reaction is conducted at a temperature of about from 120° to 220° C. and is continued until the acid number of the precondensate is less than 2;
(B) converting said precondensate into an acidic precondensate by further condensation with a polycarboxylic acid anhydride wherein said carboxylic acid anhydride is at least one of succinic acid anhydride, glutaric acid anhydride, maleic acid anhydride, phthalic acid anhydride, or trimellitic acid anhydride, and said further condensation is conducted at a temperature of about from 140° to 200° C. and continued until an acid number of about 50 to 130 is obtained;
(C) forming an alkyd resin by further esterification of said acidic precondensate with a further alcohol wherein said further alcohol is at least one of: glycerol; trimethylol ethane; trimethylol propane; pentaerythritol; the dimerization products of glycerol, trimethylol ethane or trimethylol propane; reaction products of any of the foregoing with up to 5 mols of ethylene oxide or propylene oxide; a polyol having 4 to 10 hydroxyl group selected from sorbitol, a polyglycerol with 2 to 4 ether oxygens, depentaerythritol, the reaction products of any of the foregoing polyols having 4 to 10 hydroxyl groups with up to 10 mols of ethylene oxide or propylene oxide; or any mixture thereof, said further esterification reaction is conducted at a temperature of about from 120° to 220° C. and is continued until an acid number of about 10 to 40 is obtained; and
(D) forming an alkyd resin emulsion by mixing said alkyd resin with an aminoalcohol present in an amount sufficient to neutralize said alkyd resin, an emulsifier present when said alkyd resins contain fatty acids whose average chain length is greater than $C_{16}$, and water, wherein: said aminoalcohol is: methylaminopropanol; methylaminopropane diol; tris-hydroxymethylaminomethane; reaction products of the foregoing with ethylene oxide; diethanolamine, triethanolamine; methyldiethanolamine; or any mixture thereof, and said emulsifier is at least one salt of an aminoalcohol with a 10,9- or 9,10-hydroxyalkoxystearic acid wherein said alkoxy radical is derived from: glycerol, trimethylol propane, pentaerythritol, or sorbitol; the autocondensation products of the foregoing alcohols; the reaction products of the foregoing alcohols with up to 10 mols of ethylene oxide per mol of alcohol, or any mixtures of the above, and said water is present in 25% to 5% by weight.

21. The product of the process of claim 1.
22. The product of the process of claim 2.
23. The product of the process of claim 3.
24. The product of the process of claim 5.
25. The product of the process of claim 6.
26. The product of the process of claim 8.
27. The product of the process of claim 11.
28. The product of the process of claim 12.
29. The product of the process of claim 15.
30. The product of the process of claim 16.
31. The product of the process of claim 20.

* * * * *